United States Patent [19]

Meiller

[11] Patent Number: 4,717,203
[45] Date of Patent: Jan. 5, 1988

[54] SEAT HAVING AN ADJUSTABLE SEAT PORTION

[75] Inventor: Hermann Meiller, Amberg, Fed. Rep. of Germany

[73] Assignee: Grammer Sitzsysteme GmbH, Fed. Rep. of Germany

[21] Appl. No.: 903,737

[22] Filed: Sep. 4, 1986

[30] Foreign Application Priority Data

Sep. 12, 1985 [DE] Fed. Rep. of Germany ....... 3532608

[51] Int. Cl.⁴ .......................... B60H 1/02; B60H 1/06
[52] U.S. Cl. ..................................... 297/312; 297/284
[58] Field of Search ..................... 297/312, 284, 322

[56] References Cited

U.S. PATENT DOCUMENTS

| | | | |
|---|---|---|---|
| 4,324,431 | 4/1982 | Murphy | 297/284 |
| 4,334,709 | 6/1982 | Akiyama | 297/312 |

FOREIGN PATENT DOCUMENTS

| | | |
|---|---|---|
| 3139945 | 4/1983 | Fed. Rep. of Germany . |
| 3226101 | 1/1984 | Fed. Rep. of Germany . |
| 0036732 | 3/1983 | Japan ................................. 297/312 |
| 1220225 | 1/1971 | United Kingdom ................ 297/312 |

*Primary Examiner*—James T. McCall
*Attorney, Agent, or Firm*—Lerner, David, Littenberg, Krumholz & Mentlik

[57] ABSTRACT

In a seat having a seat squab portion carried on a support structure, the seat squab portion includes a seat plate which comprises a rearward section fixed to the support structure and a forward section separate from the rearward section. The forward section is adjustable relative to the rearward section by a pivotal movement to vary its angle of inclination and by a sliding movement to vary the depth of the squab portion from front to back. A single control member is provided for both modes of adjustment.

9 Claims, 3 Drawing Figures

SEAT HAVING AN ADJUSTABLE SEAT PORTION

BACKGROUND OF THE INVENTION

The invention relates to a seat having an adjustable seat portion.

One form of seat having an adjustable seat portion comprises a support structure, for example for mounting the seat in its position of use, and, disposed on the support structure, a seat portion or squab which includes a seat plate. The seat plate is adjustable in respect of its angle of inclination relative to the support structure in the longitudinal or fore-and-aft direction of the seat, by means of an adjusting member which is disposed on the seat portion. A seat of that nature is disclosed for example in German laid-open application (DE-OS) No. 32 43 747. When the angle of inclination of the seat plate is adjusted in the fore-and-aft direction of that seat, as indicated above, in the direction of increasing the angle of inclination, then the forward end region of the seat portion is raised and the rearward end region of the seat portion is lowered, relative to the support structure which may be carried for example on an air cushion assembly. As the buttocks of a person using such a seat are supported more particularly on the rearward end section of the seat portion, that is to say, in the vicinity of the backrest portion of the seat, adjustment as indicated above, to increase the angle of inclination of the seat portion, means that the level or height at which the occupant of the seat is supported is reduced, giving a lower sitting position. When the seat is used in a vehicle for example as the seat for the driver, a lower sitting position of that nature can have a seriously adverse effect on the ease with which the driver can operate the vehicle, and thus on the degree of driving safety. It is therefore generally necessary for the occupant of the seat to compensate for the lowered sitting position by operating the air cushion or other assembly on which the support structure of the seat is carried, in order to raise the seat in its entirety. However, that in turn requires additional operation of an adjusting member so that the degree of user-friendliness of such a seat still leaves something to be desired. Furthermore, a seat of that kind only affords a given depth in the seat portion, as measured from the front edge of the seat portion to the rear edge thereof or to the location at which the seat portion meets the backrest portion, with the result that, while the seat may be satisfactory for persons of a given size, other persons of different statures may find that the level of comfort afforded by the seat is not particularly good, in particular due to insufficient support for the thighs where they extend beyond the front edge of the seat.

SUMMARY OF THE INVENTION

An object of the present invention is to provide a seat in which the seat portion thereof is adjustable both in respect of its inclination and in respect of its depth in a simple fashion.

Another object of the present invention is to provide a vehicle seat having a seat portion which is adjustable both in respect of inclination and in respect of depth by means of a single adjusting member.

Yet another object of the present invention is to provide an adjustable seat which provides for versatile adjustment of the seat portion thereof to afford a high level of seating comfort.

A further object of the present invention is to provide a vehicle seat having a readily adjustable seat squab portion which can be easily adjusted to respective user requirements.

Yet a further object of the present invention is to provide a motor vehicle seat having a seat portion adjustable in respect of inclination and in respect of depth, which readily permits the angle of inclination of the seat portion and/or the depth thereof to be adjusted without affecting the respective other adjustment factor.

In accordance with the present invention, these and other objects are achieved by a seat comprising a support structure and a seat portion or squab portion which is disposed thereon. The seat portion includes a seat plate which for example forms the base for the upholstery cushioning of the seat. The seat plate of the seat portion comprises a rearward section which is fixed with respect to the support structure, and a forward section which is separate from the rearward section. The forward section is so mounted as to be adjustable in respect of its inclination in the fore-and-aft direction on the support structure relative to the rearward portion and is also adjustable with a linear movement in the fore-and-aft direction on the support structure relative to the rearward portion thereby to vary the depth of the seat, namely the dimension between the forward edge of the seat portion and the rearward edge of the seat portion. The seat has a single adjusting member for securing the forward section of the seat plate both in its adjusted position in respect of angle of inclination and in its adjusted position in respect of the depth of the seat portion.

The fact that the seat plate is made up of a fixed rearward section and a forward section which is separate from and movable relative to the rearward section means that it is not only possible to pivot the forward section of the two-part seat plate relative to the support structure of the seat in order to adjust the angle of inclination of the seat portion as desired, but it is also possible to adjust the spacing between the forward section and the rearward section of the seat plate in order in that way to be able to vary the depth of the seat from the forward edge to the rearward edge thereof. As the forward section of the seat plate can be locked relative to the seat support structure in the fore-and-aft or longitudinal direction of the seat by means of the same adjusting member which is provided for fixing the seat in the adjusted angle of inclination, it is accordingly only necessary to operate one adjusting member in order to adjust the seat portion in both of its modes, namely both in respect of angle of inclination and in respect of the seat depth, so that the seat is easy and convenient to adjust by the occupant thereof.

In a preferred embodiment of the invention, the forward section of the two-part seat plate may be mounted pivotably about a pivot axis on mounting brackets which in turn are arranged slidably in the longitudinal or fore-and-aft direction of the seat on the seat support structure. The pivot axis is preferably provided at the end part of the forward section of the seat portion, which is towards the rearward section of the seat portion. The fact that the pivot axis is disposed at the end part of the forward section of the seat plate, which is towards the rearward section of the seat plate, which in turn is in a fixed position relative to the support structure, means that the forward section of the seat plate enjoys a relatively large range of pivotal movement relative to the rearward section of the seat plate. As a consequence, the seat gives a high level of sitting comfort both for persons who have long legs and for persons who have short legs, for the reason that the forward section of the two-part seat plate and thus the forward region of the seat portion of the seat can be adapted in a highly satisfactory manner to the position of the hollows of the knees of the legs of the person using the seat. In other words, for a person who has a long lower leg as measured between the knee joint and the ankle joint, with the result that when that person is sitting in the seat the knees of that person are at a relatively great height from the surface such as the floor of a motor vehicle on which the seat is supported, the forward section of the seat plate can be pivoted upwardly to a very substantial degree in order still to support the back of the knees of that person, in spite of the high level at which the knees are positioned.

It will be appreciated however that, even in the event of the occupant making adjustments of substantial magnitude in regard to the angle of inclination of the forward section of the seat plate or in regard to the fore-and-aft positioning of the forward section of the seat plate in order to adjust the seat depth, the occupant of the seat will always remain at the same height as set by adjustment of the assembly supporting the seat on the mounting surface, for the reason that the rearward section of the seat plate remains unchanged in its height in relation to the support structure of the seat.

In another preferred embodiment of the seat according to the invention, a shaft or spindle is rotatably mounted between the above-mentioned mounting brackets which support the forward section of the seat plate. For the purposes of adjustment of the angle of inclination of the forward section of the seat plate, the shaft or spindle carries at least one plate or bar portion which projects radially relative to the shaft or spindle and which is arranged to bear against the underside of the front section of the seat plate. The bar or plate portion is spring-biased to urge the front part of the forward section of the two-part seat plate in an upward direction about its pivotal mounting axis. A lever having first and second arms is mounted intermediate its ends pivotally about an axis projecting from the underside of the forward section of the seat plate. The end part of one of the arms of the lever carries an engagement portion which, for the purposes of securing the forward section of the seat plate in a set position in respect of seat depth, is engageable into a locking opening in a locking plate member which is secured to the support structure. At the free end of the other arm, the lever bears against a displacement portion of the adjusting member. Operation of the adjusting member will thus move the displacement portion to displace the lever between respective positions in which the engagement portion at the end of the first arm is engaged into and disengaged from the locking opening in the locking plate member secured to the support structure.

The spindle or shaft which is mounted between the mounting brackets may be for example a metal tube to which first and second bar or plate portions are welded in respective planes which are disposed parallel to each other and at a spacing from each other in the axial direction of the metal tube, with the bar or plate portions extending radially away from the metal tube. The arrangement of the actuating lever which is carried pivotally on an axis extending from the underside of the forward section of the two-part seat plate provides a simple construction while also ensuring that the lever can be pivoted by means of a single adjusting member both for the purposes of adjusting the angle of inclination of the forward section of the seat plate and also for adjusting the forward section in the fore-and-aft direction of the seat portion with a linear or sliding movement, thereby to set a desired seat depth.

In an advantageous embodiment, the pivot axis about which the forward section of the two-part seat plate is pivotable and the above-mentioned engagement portion carried on the end of the first arm of the actuating lever are aligned with each other. In that way it is readily possible to adjust the angle of inclination of the forward section relative to the support structure as desired, and to secure it in its set angular position.

The above-mentioned at least one bar or plate portion which is fixed to the shaft or spindle extending between the mounting brackets preferably comprises first and second diametrally oppositely disposed portions. The first portion bears, under the resilient prestressing of the lever, against the underside of the forward section of the seat plate, while the second portion is provided with locking or detent openings which are disposed in superposed relationship. The displacement portion of the adjusting member extends into one of the locking or detent openings, in a respective one of the various possible set positions of the forward section of the seat plate. By virtue of the engagement portion provided on the free end of the first arm of the double-armed actuating lever, with the locking plate member which is secured to the support structure, thereby to secure the forward section of the seat plate in a set position in regard to the seat depth, and by virtue of the free end of the second arm of the double-armed actuating lever simultaneously co-operating with the displacement portion of the adjusting member, which extends into one of the locking openings in one of the various possible inclined positions of the forward section of the seat plate, it is advantageously possible to use a single adjusting member to adjust the angle of inclination of the forward section of the seat plate with respect to the support structure and/or simultaneously to adjust the seat depth, that is to say the spacing between the forward section of the seat plate, which is displaceable relative to the seat support structure in the longitudinal direction of the seat with a linear or sliding motion, and the rearward section of the seat plate, which is fixed to the seat support structure, with the forward section being locked in the respective selected position of adjustment.

The invention thus provides a seat which affords a very high level of seating comfort and substantial ease of adjustability to achieve a desired seating position, while moreover the level or height of the surface of the seat portion, above the surface on which the seat is supported, is not altered when the angle of inclination and/or the seat depth of the seat portion are adjusted. The fact that the height of the seat portion remains constant means that, when the seat is used in a land, air or water-borne vehicle, control safety is not adversely affected by variations in the height of the seat.

Further objects, features and advantages of the teaching of the present invention will be apparent from the following description.

DESCRIPTION OF THE PREFERRED EMBODIMENT

Figure 1:
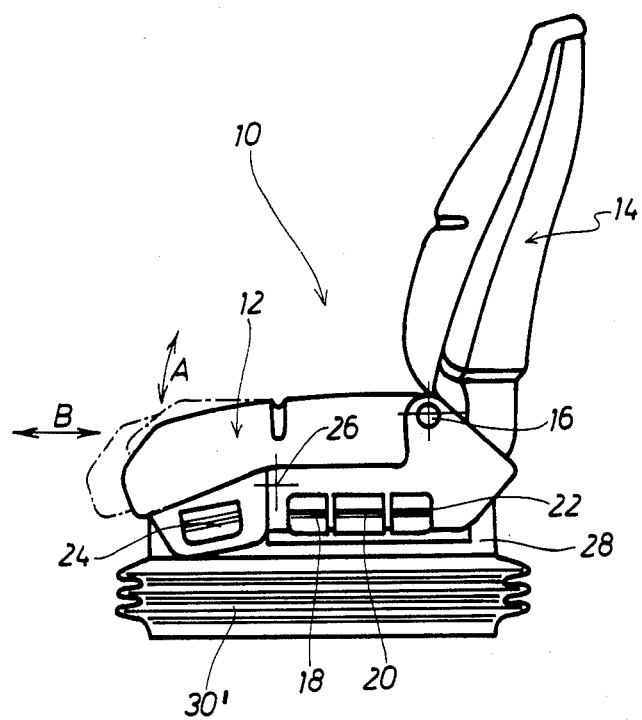
FIG. 1 is a side view of a seat showing in dash-dotted lines varying adjusted positions of the seat, with different angles of inclination and different seat depth settings.

Referring firstly to FIG. 1, shown therein is a seat as indicated generally at 10, for example a motor vehicle seat. The seat 10 comprises a seat portion or squab portion 12 and a backrest portion 14 which is adjustable in regard to its angle of inclination relative to the seat portion 12, by pivotal movement about an axis diagrammatically indicated at 16. Disposed on one side of the seat portion 12 are actuating members 18, 20 and 22, and an adjusting or setting member 24.

In regard to the actuating members 18, 20 and 22, attention is directed for example to co-pending patent application U.S. Ser. No. 853,003 of Apr. 17, 1986 the content of which is hereby appropriately incorporated into this description.

Regarding now the adjusting or setting member 24, it is possible therewith to adjust the effective angle of inclination of the seat portion 12 and/or the seat depth of the seat portion 12, that is to say, the dimension of the seat portion 12 as measured from the forward edge thereof to the rearward edge thereof or to the backrest portion 14. For the purposes of adjusting the effective angle of inclination of the seat portion and/or the seat depth of the seat portion 12, the seat portion is made up of forward and rearward parts respectively, in a manner which will be described in greater detail hereinafter.

In FIG. 1 however, reference numeral 26 denotes an axis of pivotal movement of the forward part of the seat portion 12, as indicated by the double-headed arrow A. The axis 26 is shown in FIG. 1 by a cross composed of thinner lines than the other lines making up the drawing.

Adjustment of the seat depth is indicated in FIG. 1 by the double-headed arrow B, being therefore in the longitudinal or fore-and-aft direction of the seat portion 12. As mentioned above, both the angular adjustment of the forward part of the seat portion 12 and the linear fore-and-aft adjustment of the forward part of the seat portion 12 are controlled by means of the same adjusting or setting member 24. Accordingly, the seat 10 according to the invention permits adjustment in the direction indicated by the arrow A and at the same time also adjustment in the direction indicated by the arrow B.

Reference numeral 28 in FIG. 1 denotes a seat support structure while reference numeral 30' discloses an assembly such as an air cushion as for mounting the seat with its support structure 28 on a suitable mounting surface, for example the floor of a vehicle.

Figure 2:
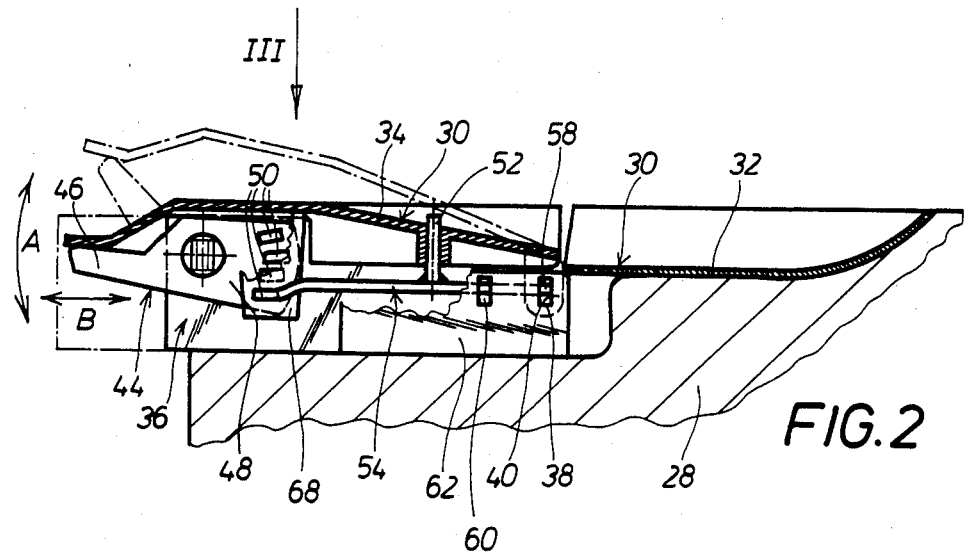
FIG. 2 is a diagrammatic side view in partial section of major parts of the seat, the cushion upholstery of the seat being omitted for the sake of enhanced clarity of the mode of operation of the arrangement according to the invention.
Figure 3:
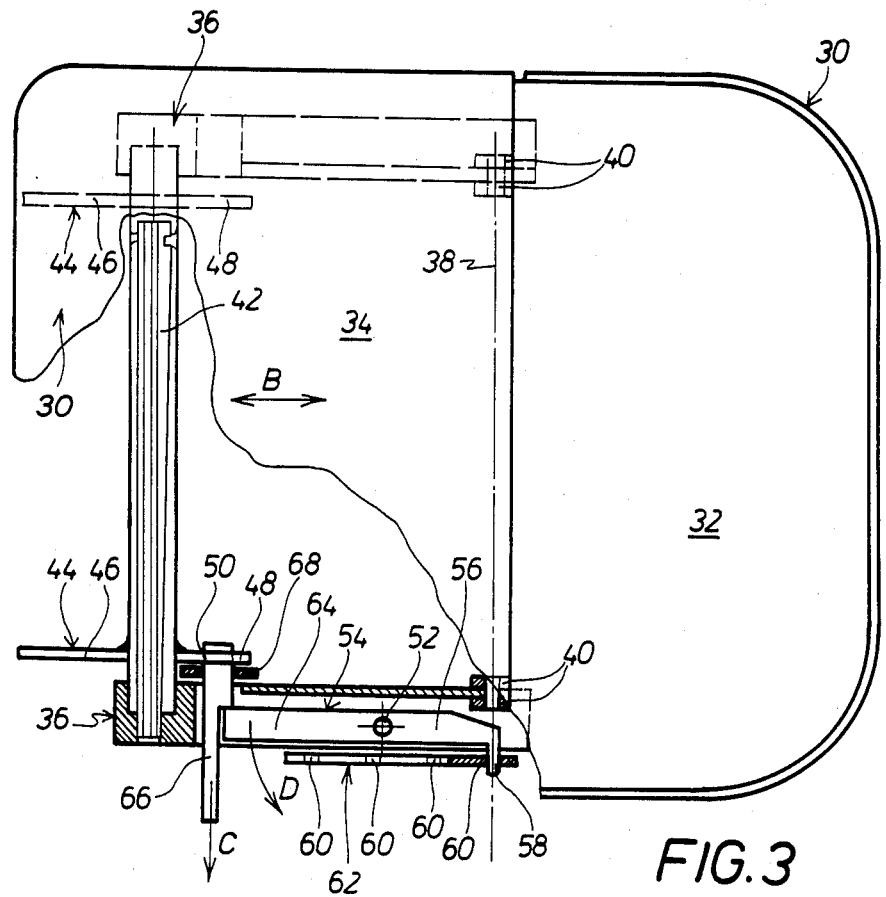
FIG. 3 is a view in the direction indicated by the arrow III in FIG. 2, showing the operating assembly of the arrangement of the invention.

Reference will now be made to FIGS. 2 and 3 which show the seat portion 12 of the seat 10 shown in FIG. 1, in greater detail. As shown in FIGS. 2 and 3, the seat portion 12 comprises a seat plate 30 which forms the base plate for supporting the cushion upholstery of the seat, although the cushion upholstery is not shown in FIGS. 2 and 3. The seat plate 30 is thus arranged in the interior of the seat portion 12. Part of the support structure 28 is also shown in FIG. 2, showing the way in which it supports the seat plate 30.

For the purposes of adjustment of the effective angle of inclination of the seat portion and/or for adjustment in respect of the depth of the seat portion, as measured in the fore-and-aft direction, the seat plate comprises a rearward section 32 which is fixed with respect to the support structure 28, and a forward section 34 which is separate from the rearward section 32. In FIG. 2, the forward section 34 is shown in two different positions in regard to its angle of inclination, namely the solid-line position in which the forward section 34 is lowered, and a position shown in dash-dotted lines in which the forward section 34 is more steeply inclined upwardly at its forward edge. It will be noted that FIG. 3 only shows part of the forward section 34 of the two-part seat plate 30, for the sake of ease of viewing other components of the arrangement of the seat.

Besides being pivotally adjustable to provide for varying angles of inclination, the forward section 34 which is separate from the fixed rearward section 32 is displaceable by a sliding or linear movement as indicated by the double-headed arrow B in FIG. 2, in the fore-and-aft or longitudinal direction of the seat, on the support structure 28, relative to the rearward section 32, thereby providing for adjustment in respect of the depth of the seat portion 12. The forward section 34 of the two-part seat plate 30 can be secured or locked in its adjusted position relative to the support structure 28 by means of the setting or adjusting member 24 (shown in FIG. 1), the member 24 thus providing a locking action for the forward section 34 both in regard to its pivotal movement for adjustment of the angle of inclination and in regard to its linear fore-and-aft movement to adjust the depth of the seat portion.

Referring now more particularly to FIG. 3, it will be seen therefrom that the forward section 34 of the seat plate 30 is mounted on mounting brackets 36 pivotally about a pivot axis as indicated at 38. The pivot axis 38 is indicated by the thin dash-dotted line in FIG. 3, being defined by plate members 40 which are provided at the underside of the forward section 34 of the seat plate. The mounting brackets 36 are arranged on the support structure 28 in such a way as to be displaceable in the fore-and-aft direction of the seat, as indicated by the double-headed arrow B. The pivot axis 38 is disposed at the end part of the forward section 34, which is towards the rearward section 32. That positioning of the pivot axis 38 is clearly apparent from FIG. 2 as well as from FIG. 3.

Furthermore, as shown in FIG. 3, a shaft or spindle 42 is mounted rotatably between the mounting brackets 36, at a position adjacent the forward ends thereof, as can be best seen from FIG. 3. For the purposes of adjustment of the angle of inclination of the forward section 34 of the seat plate 30, by pivotal movement about the pivot axis 38, in the directions indicated by the arrow A, the shaft 42 carries first and second bar or plate members 44 which are disposed at a spacing from each other in the axial direction of the shaft 42 and which are secured to the shaft 42 in respective planes which are substantially in radial relationship therewith. The members 44 are secured to the shaft 42 for example by welding.

Each plate member 44 comprises first and second portions as indicated at 46 and 48 in FIGS. 2 and 3, which are disposed on respective diametrically opposite sides of the shaft 42 on which they are mounted. The portion 46 of at least one of the two members 44 is subjected to a resilient biasing force which urges it into contact against the underneath surface of the forward section 34, while the second portion 48 of at least one of the two members 44 has locking or detent openings 50 (see FIG. 2) which are arranged in superposed relationship. The resilient biasing force acting on at least one of the members 44 causes the first portions 46 thereof to be pressed at all times firmly against the underside of the forward section 44 in such a way that, when the adjusting member 24 shown in FIG. 1 is actuated in the direction indicated by an arrow C in FIG. 3, the members 44 cause the forward section 34 of the seat plate 30 to pivot upwardly at the forward edge thereof, about the pivot axis 38, until the forward section 34 reaches an inclined position which suits the person occupying the seat. When the forward section 34 is in that desired inclined position, the member 24 is released whereby the forward section 34 is arrested in its set position of inclination. That therefore varies the effective angle of inclination of the seat portion 12.

Referring still to FIGS. 2 and 3, it will be seen that reference numeral 52 denotes a pivot mounting member which projects away from the underside of the forward section 34 of the two-part seat plate 30. Mounted pivotably about the member 52 in the direction indicated by the arrow D in FIG. 3 is a lever 54 which has first and second arms at respective sides of the pivot mounting member 52. The respective arms of the lever 54 are indicated by references 56 and 64 in FIG. 3.

At the free end of its arm 56, the lever 54 carries an engagement portion 58 which is engageable into a respective selected one of a plurality of locking or detent openings 60 provided in a locking plate member 62 suitably secured to the support structure 28. The plurality of openings 60 are identified as such as in FIG. 3. Engagement of the portion 58 into the respective opening 60 thus secures the forward section 34 of the two-part seat plate in its selected position of adjustment of the seat depth of the seat portion 12.

The end part at the free end of the second arm 64 of the lever 54 bears against a displacement portion 66 which forms part of or is suitably connected to the adjusting member 24 shown in FIG. 1.

The displacement portion 66 is capable of engaging into a respective selected one of the openings 50 provided in the adjacent plate member 44 carried on the shaft 42.

Upon actuation of the member 24 such as to cause displacement of the displacement portion 66 in the direction indicated by the arrow C in FIG. 3 therefore, the portion 66 comes out of the opening 50 in which it is engaged, whereby the angle of inclination of the forward section 34 of the seat plate 30 can be suitably adjusted. The occupant of the seat thus allows the forward section 34 to pivot upwardly under the force of the spring means acting on the plate members 44, or on the other hand presses the forward section 34 downwardly, until the forward section 34 is in the required position, whereupon the member 24 is released to secure the adjusted position.

At the same time as the adjusting member 24 is actuated in the direction indicated by the arrow C in FIG. 3, the lever 54 is pivoted in the direction indicated by the arrow D in FIG. 3 so that the engagement portion 58 comes out of the opening 60 in which it was engaged, thereby permitting the depth of the seat portion 12 to be altered by displacement of the forward section 34 of the seat plate in the direction indicated by the arrow B in FIGS. 2 and 3.

It will be seen from FIG. 2 that the pivot axis 38 about which the forward section 34 is pivotable in the direction indicated by the arrow A and the engagement portion 58 of the double-armed lever 54 are aligned with each other. That arrangement provides for easy pivotability of the forward section 34 with respect to the support structure 28.

Referring still to FIGS. 2 and 3, the displacement portion 66 connected to the adjusting member 24 is guided in a suitable guide element 68 which is secured to the underside of the forward section 34. The guide element 68 is in the form of a plate of trapezoidal configuration, which is disposed adjacent to the plate member 44 which has the openings 50 therein.

It will be appreciated that the foregoing construction has been described solely by way of example of the principles of the present invention and that various other modifications and alterations may be made therein without thereby departing from the spirit and scope of the invention.

What is claimed is:

1. A seat comprising a support structure and a seat portion carried on said support structure, said seat portion including a seat plate and a seat back portion, said seat plate including a rearward seat plate portion at a location proximate to said seat back portion, and a forward seat plate portion separate from said rearward seat plate portion, said rearward seat plate portion being fixed with respect to said support structure, and said forward seat plate portion including a first end proximate to said rearward seat plate portion and a second end comprising the front end of said seat portion, said first and second ends of said forward seat plate portion defining a longitudinal direction for said forward seat plate portion, and mounting means for pivotably and slidably mounting said forward seat plate portion with respect to said support structure whereby said forward seat plate portion can be pivoted about a pivot axis located proximate to said first end of said forward seat plate portion so as to vary the angle of inclination of said forward seat plate portion with respect to said support structure, and said mounting means can be slidably moved along said support structure in said longitudinal direction.

2. A seat according to claim 1, including locking means for locking the position of said forward seat plate portion with respect to said support structure.

3. A seat according to claim 1, wherein said mounting means includes at least one actuating member in contact with the lower surface of said forward seat plate portion, and biasing means urging said actuating member against said lower surface of said forward seat plate portion so as to urge said forward seat plate portion pivotably upward about said pivot axis.

4. A seat according to claim 3, including lever means pivotably mounted on said mounting means about a predetermined pivot point, said lever means including a first end and a second end pivotable about said predetermined pivot point in opposite directions, said first end of said lever means including engagement means, and holing means mounted on said support structure adjacent to said lever means, said holding means including a plurality of apertures adapted for selective engagement with said engagement means corresponding to selected locations of said seat in said longitudinal direction, whereby upon pivoting of said lever means about said predetermined pivot point in a predetermined direction, said engagement means is caused to disengage from said one of said plurality of apertures in said holding means.

5. A seat according to claim 4 including displacement means in operative engagement with said second end of said lever means, said displacement means being displaceable between first and second displacement positions, whereby upon displacing said displacement means from said first displacement position to said second displacement position, said second end of said lever means is caused to pivot about said predetermined pivot point in said predetermined direction.

6. A seat according to claim 5 wherein said predetermined pivot point includes a pivot axis which extends in a direction substantially perpendicular to said longitudinal direction.

7. A seat according to claim 4 wherein said engagement means projects from said first end of said lever means in a predetermined direction substantially parallel to said pivot axis.

8. A seat according to claim 5 wherein said mounting means includes a pair of mounting members on opposite sides of said forward seat plate portion extending in said longitudinal direction, and shaft means rotatably mounted with respect to said pair of mounting members, and wherein said actuating member is mounted on said shaft means and includes a first actuating member portion in contact with said lower surface of said forward seat plate portion and a second actuating member portion on the opposite side of said shaft means with respect to said first actuating member portion, said second actuating member portion including a plurality of actuating member apertures adapted for selective engagement with said displacement means corresponding to selected angles of inclination of said forward seat plate portion, whereby displacing said displacement means from said first displacement position to said second displacement position causes said displacement means to disengage from said one of said plurality of apertures in said second actuating member portion.

9. A seat according to claim 8 including guide means for guiding said displacement means between said first and second displacement positions.

* * * * *